April 9, 1946.  N. N. SAUDER  2,398,119
LOAD HANDLING ATTACHMENT FOR TRACTORS
Filed April 19, 1945  3 Sheets-Sheet 2

INVENTOR.
NOAH N. SAUDER
BY Murray W. Gould
ATTY.

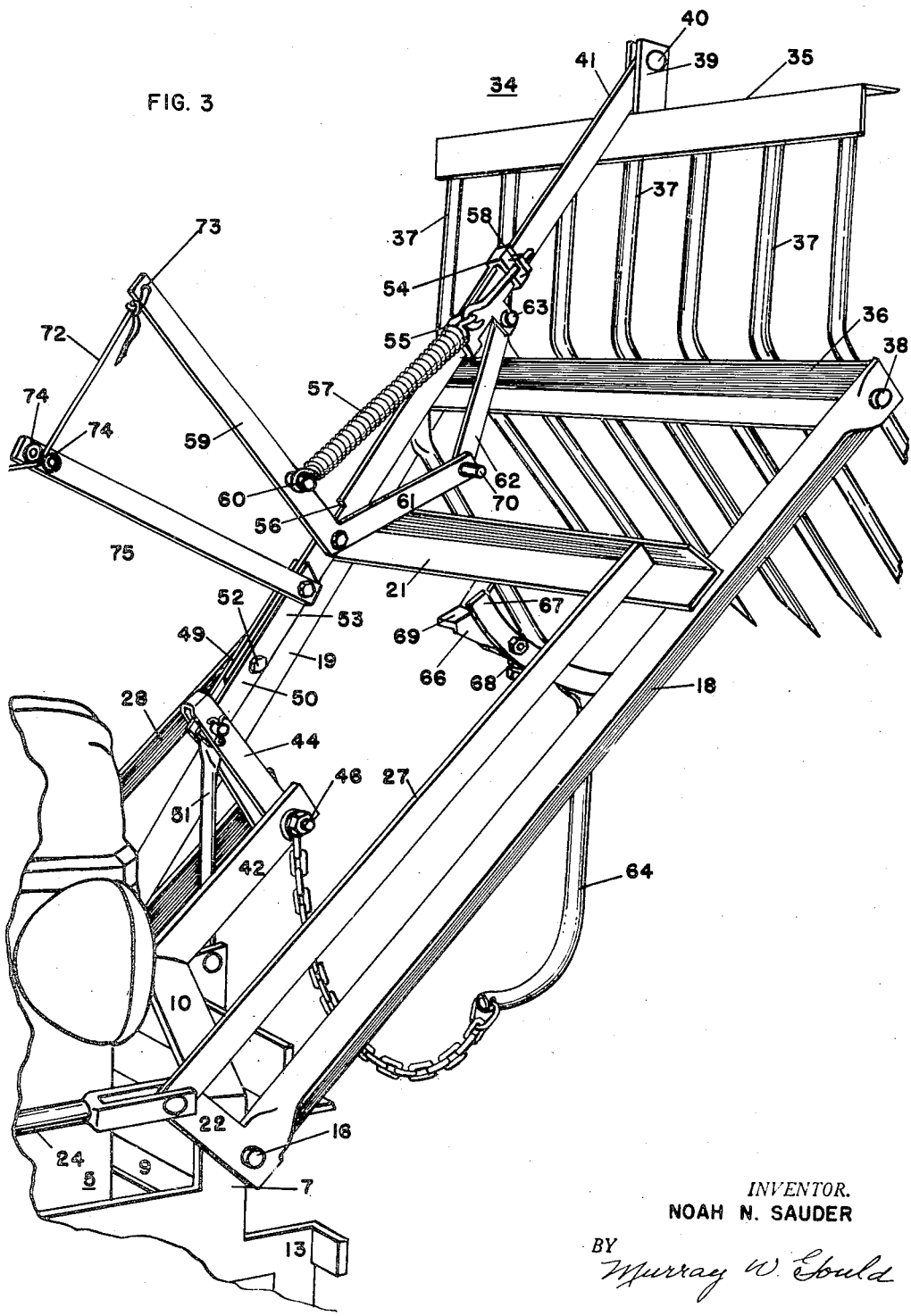

Patented Apr. 9, 1946

2,398,119

UNITED STATES PATENT OFFICE 2,398,119

LOAD HANDLING ATTACHMENT FOR TRACTORS

Noah Nolt Sauder, New Holland, Pa.

Application April 19, 1945, Serial No. 589,111

4 Claims. (Cl. 214—140)

This invention relates to an attachment for Ford Ferguson tractors and is designed to be operated from the regular tractor hydraulic power system together with an auxiliary hydraulic lift.

The object of this invention is to provide a load handling attachment which may be quickly and easily secured to the front end of a Ford Ferguson tractor, which does not extend beyond the width of the tractor and can be positioned so that its height does not extend above the highest point of the tractor.

An object of the present invention is to provide a load handling attachment for a Ford Ferguson tractor which operates through the usual hydraulic power control for that tractor and which is attached to the front end of the tractor so that the working of the load handling device is at all times apparent to the operator of the tractor.

A further object of the present invention is to provide a load handling attachment for tractors which through a minimum of operating parts, will handle a load up to one-half ton either carrying or lifting and will raise such load to a height sufficient to load the ordinary vehicle.

A further object of the present invention is to provide an auxiliary lift acting in conjunction with the ordinary hydraulic power system of the tractor and designed to be operated by the regular hand control lever and from the same source of power supply.

A still further object of the present invention is to provide an automatic means for dumping the load carried by the load handling attachment when said load is in its extreme upper position.

A still further object of the present invention is to provide manual means for dumping said load at any position of the load handling apparatus and also holding the fork in its dumping position.

A still further object of the present invention is to provide a latching mechanism which supports the load carrying apparatus in load handling position, maintaining said latch in locked position through the action of a spring and means for releasing said latch from latching position, said means including both automatic and manual operable methods.

A still further object of the present invention is to provide interchangeable load carrying members which may be attached to the load handling apparatus to provide different members for handling different material.

A still further object of the present invention is to provide such load handling apparatus for attachment to the front end of a Ford Ferguson tractor which is operable through a single control.

A still further object of the present invention is to provide a removable draw bar which is attached to the load handling apparatus and which may be used in any number of various ways in connection with pushing or pulling.

With the foregoing and other objects in view, the invention resides in the novel arrangement and combination of parts and in the details of construction hereinafter described and claimed, it being understood that changes in the precise embodiment of the invention herein described may be made within the scope of what is claimed without departing from the spirit of the invention.

The invention is illustrated in the accompanying drawings in which:

Fig. 3 is a detailed view of the latching mechanism with the load carrying member in dumping position.

Figure 1:
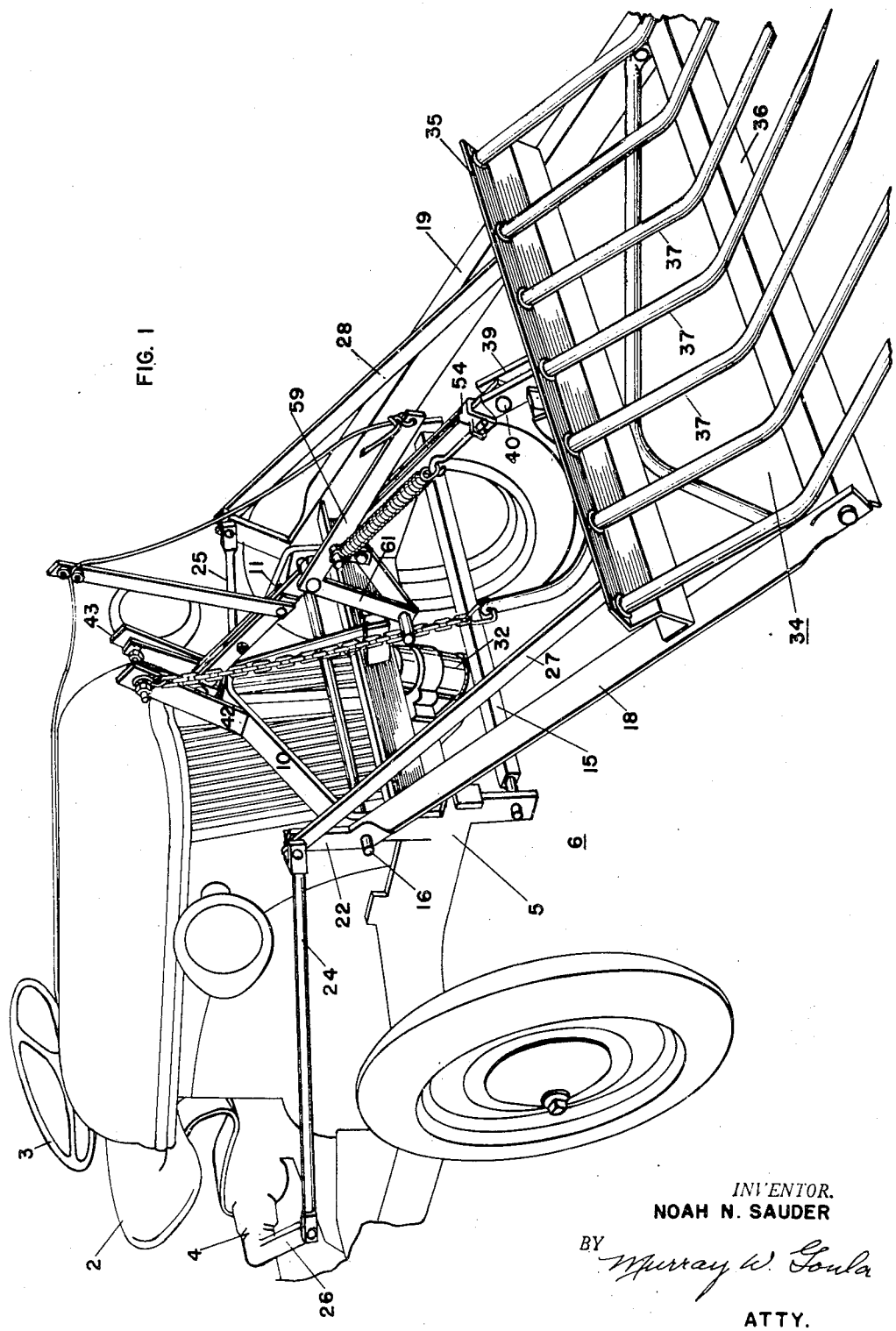
Fig. 1 is a perspective view of the tractor and attachment with the load carrying member in its lowermost position.

The load handling attachment as illustrated in the drawings is shown attached to a Ford Ferguson tractor 1 having the usual driver's seat 2, steering apparatus 3, and hydraulic lift arm 4.

Secured to the front assembly 5 is a stationary framework 6 attached to the front axle and radius rod made up of a pair of upright members 7 and 8 joined by a crossbar 9 and continuing upward and inward as members 10 and 11 to join in inverted V formation at 12 forwardly projecting brackets 13 and 14 are secured to the lower ends of upright members 7 and 8 respectively and carrying a removable draw-bar 15.

Pivotally mounted by means of pivot rod 16 journaled in the uprights 7 and 8 is a framework 17 composed of side members 18 and 19 and lower cross end members 20 and upper end cross member 21. Welded to and forming a part of the side members 18 and 19 are arms 22 and 23 respectively. These arms extend at right angles from the lowermost part of the side members 18 and 19 and are supported by braces 27 and 28 extending from connecting point to the upper cross member 21 of frame 17 and are connected at their meeting ends with operating rods 24 and 25 respectively.

These rods 24 and 25 are connected to cranks 26 connected to and operated from the power hydraulic lift arm 4. This power arm 4 is the standard equipment on the Ford Ferguson tractor and is operated from a hydraulic pump which is also part of the standard equipment. The crank arm 26 is secured to the hydraulic arm 4 by welding or any suitable means.

Centrally located on the lower cross member 20 is a socket member 29 which receives the ball end 30 of a piston rod 31 operated by the hydraulic cylinder 32 which is connected in series with the hydraulic cylinder on the power shaft 4 by a hose connection 33. The piston 32 operating in conjunction with the piston forming part of the regular power system of the tractor (not shown) and operating a crank arm 26 furnished the motive power for raising and lowering the frame 17.

Pivotally mounted on the upper end of the frame 17 and beyond the upper cross member 21 is a load carrying fork 34 which is made up of a head member 35, a central cross member 36 and a plurality of tines 37. The central member 36 carries pivot pins 38 which are journaled in the upper end of the side frame members 18 and 19. The load carrying fork 34 may be replaced by a scoop or shovel or by any other load carrying member which could be inserted in place of the fork, or a scoop or shovel may be placed on top of the fork and so attached that it can be easily and quickly removed. Extending from the head member 35 of the fork is a yoke 39 having mounted therein a pivot pin 40 which supports one of a pair of sliding bars 41.

Integrally formed with the brace members 10 and 11 is a pair of parallel strips 42 and 43 so mounted as to extend upward and forwardly of said brace members 10 and 11 to provide an upper pivotal support for a U-shaped link 44 which is pivotally mounted at 46 and 47 to the upstanding strips 42 and 43. The free end of strips 44 and 45 are connected by a pivot pin 48 which supports a pair of parallel link members 49 and 50 and an operating rod 51. Pivotally mounted at the free end of the parallel links 49 and 50 by means of a bolt 52 is the second member 53 of the pair of sliding members previously mentioned 41 being the sliding member cooperating with 53. Each of the members 53 and 41 have U members 54 and 55 which fit around the companion sliding member and serve to hold the two cooperating members in sliding position. These U members 54 and 55 are welded to the respective sliding members 53 and 41. Located midway of the sliding member 53 is a notch 56 which receives the U member 55 of the lever 41 and securely locks the load carrying fork 34 in load supporting position.

The U member 55 is held in the notch 56 through the action of a spring 57 which is anchored at 58 to the U member 54 of the sliding member 53 and secured at its free ends to the L-shaped lever 59 at 60. The short arm 61 of the L-shaped lever 59 pivotally supports a link 62 which in turn is pivotally connected at 63 to the sliding member 41. The action of the spring is such that when the fork is in load supporting position the pull of the spring is exerted downwardly on the lever 62 which in turn urges the bent U member 55 of the lever 41 into the notch 56.

The hydraulic cylinder 32 acting through piston 31 and ball and socket joint 30 and 29 acts against the cross member 20 through the operating rod 51 and operates the U-shaped link 44 in a semicircular movement and serves to maintain the load carrying fork so that the tines 37 are held in a substantially horizontal position regardless of the height of the loading carrying fork. This will be more specifically pointed out in the description of the operation.

A release lever 64 is shown in the form of a Y pivoted at 65 to the ends of the frame members 18 and 19. This release lever carries a latch member 66 pivoted on an arcuate shaped link 67 and adjustable as to its relative position by an adjusting bolt 68. The surface 69 of the latch 66 is adapted to engage the pin 70 of the L-shaped lever 61, forcing the lever 62 upward and releasing the U member 55 of the lever 41 from the notch 56, the weight of the load carried on the times 37 immediately causing the load carrying fork to pivot on the pins 38 dumping the load. To augment the releasing lever 64 a rope 72 is attached at 73 to the extreme end of the L-shaped lever 59 and passing through guide rollers 74 carried on strip 75 extends back to the driver's seat and provides manual operable means for releasing the U member 55 from the notch 56 and allowing the load handling fork to pivot and dump the load.

Figure 2:
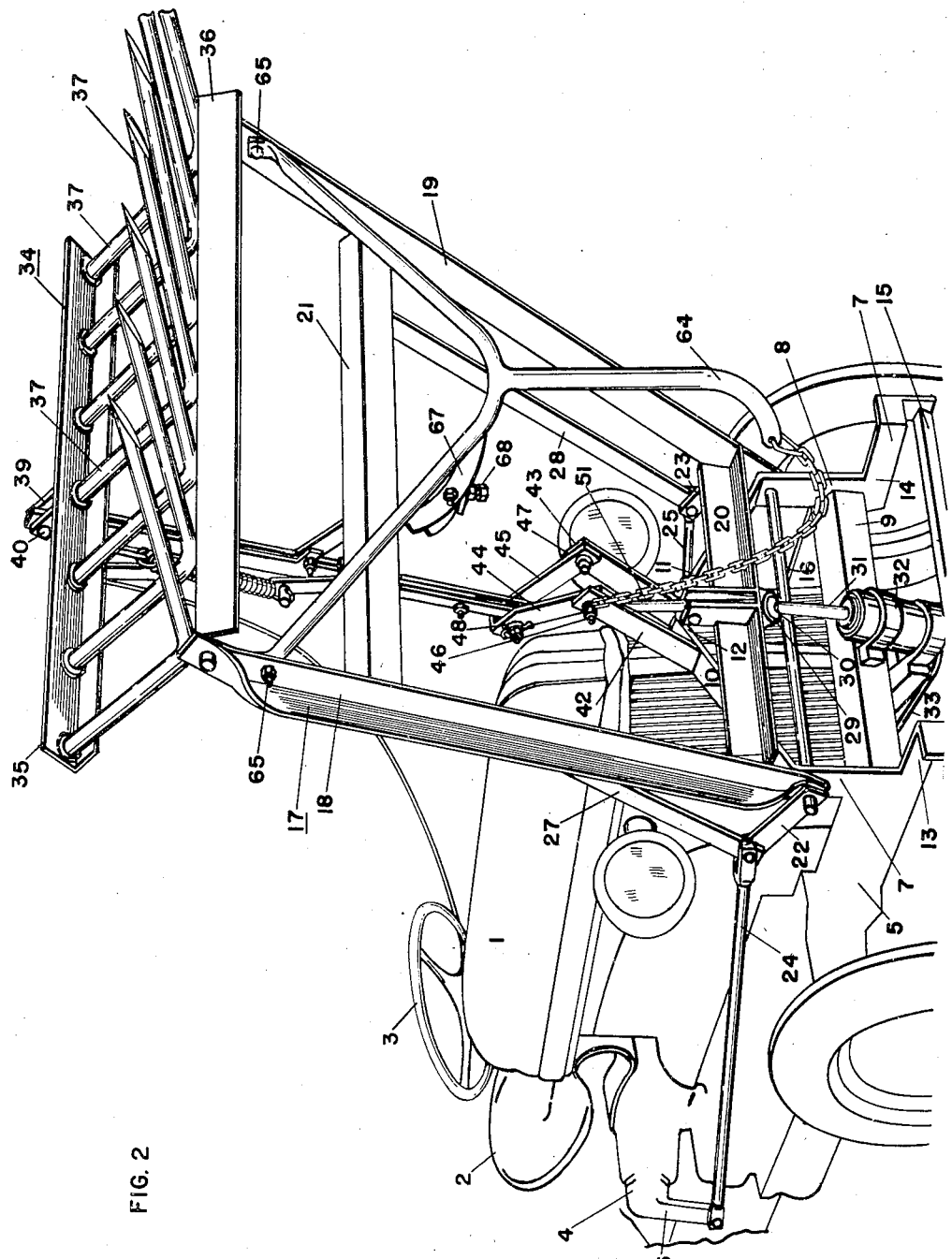
Fig. 2 is a view showing the member in its extreme upper position.

The operation of the device is a combination of the movement of the tractor together with the movement of the frame work 17 and the load carrying fork 34 through the operation of the hydraulic lifting members 32 and 4. The driver having the fork in the position shown in Fig. 1 urges the tractor forward, forcing the tines 37 under the load to be lifted until he has sufficient load well on the load carrying fork 34. This may be done with the load carrying fork 34 at any level from extreme upper position to extreme lower position. Should it be done while the fork is in the extreme lower position the hydraulic cylinders 32 and 4 are operated through the usual auxiliary mechanism provided on the Ford-Ferguson tractor and the load is raised to a position desirable for dumping into a spreader or a wagon for transportation. The specific purpose of the mechanism illustrated is for handling manure and for loading the manure spreaders from the pile or stack of manure generally kept adjacent the barn, or in the stable. With the operation of the hydraulic lifting members 32 and 4, the frame 17 is raised, the linkage connected at 40 to the load carrying member 34 serving to support the tines 37 in horizontal position during the entire lifting operation. With the load in lifted position, at any desirable level but for purposes of illustration shown in Fig. 2, the motive power of the tractor is again called into play and the load carried from the manure pile to the manure spreader, the load being at sufficient height to be above the sides of the spreader. The sides of the spreader truck, etc. are engaged by the release lever 64, which swings the latch 66 inward, the surface 69 engaging the pin 70, forcing the link 62 upward releasing the U member 55 from the notch 56 against the action of the spring 57 and allowing the load carrying member 34 to pivot on the pivot 38 through the weight of the load itself as shown in Fig. 3. With the release of the weight the spring 57 immediately returns the load carrying member 34 to the position shown in Fig. 2 at which time the operation may be repeated.

This invention is designed to be applied to a Ford-Ferguson tractor and has the peculiar advantages of being of less width than the tractor and so secured to the tractor that there is no mechanism projecting above the uppermost point of the tractor, making it possible to house the complete mechanism within the space usually occupied by the tractor so far as height and width is concerned. It, therefore, provides an attachment which may be housed in the ordinary barn which may be manipulated through the barn doors without alteration to the doors and which provides a means for loading manure spreaders with as much as a half ton at a time.

What is claimed is:

1. A load handling attachment for a tractor having an auxiliary power system thereon comprising a stationary framework secured to the front end of said tractor and extending upward to a point below the uppermost point of the tractor radiator, a movable framework pivoted to the lower part of said stationary framework, means connecting said movable framework to said auxiliary power system to raise and lower said movable framework, a load carrying fork pivotally mounted at the free end of said movable framework, a U-shaped lever pivotally mounted in the upper part of said stationary framework, a pair of sliding links connected to said U-shaped member at one end and to said load carrying fork at the other end whereby movement of the movable framework about its pivot causes pivotal movement in the U-shaped member and sliding movement in the sliding members to maintain said pivoted fork in substantially horizontal position.

2. A load carrying attachment for a tractor having an auxiliary power system thereon comprising a stationary framework secured to the front end of said tractor, a movable framework pivotally mounted to the lower part of said stationary framework, means connecting said movable framework with said auxiliary power system to swing said movable framework about its pivot, a load carrying fork pivotally mounted at the free end of said movable framework, a U-shaped member pivotally mounted to the upper end of said stationary framework, a pivot pin in the free end of said U-shaped member, a link member connecting the movable framework to said U-shaped member and swinging said U-shaped member in an arc directly opposite and equal to the arc of the movable framework, a pair of sliding links connected to said pivot pin of said U-shaped member at one end and to the load carrying fork at the other end, means for locking said sliding members in a position to support said load carrying fork in substantially horizontal position during any position of said movable framework, means for releasing said locking means to cause the load carrying fork to pivot and release the load, and means for returning said load carrying fork to substantially horizontal position after the release of said load.

3. A load handling attachment for tractors having an auxiliary power system thereon, comprising a stationary framework mounted on the front end of said tractor, a movable framework pivoted at one end to the lower part of said stationary framework, means connecting said movable framework to said power system to swing said framework about its pivot, a load carrying fork pivotally mounted at the free end of said movable framework, link mechanism connected to the upper part of said stationary framework and to said load carrying fork to normally maintain said load carrying fork in substantially horizontal position, means for locking said link mechanism in said fork supporting position, automatic means for releasing said locking means at the uppermost position of said load carrying fork and manual means for releasing said locking means at any position of said fork.

4. A load handling attachment for tractors having an auxiliary power system thereon comprising a stationary framework carried on the front end of said tractor, a movable framework pivotally mounted at one end to the lower part of said stationary framework, means connecting said movable framework with said auxiliary power system, an auxiliary power cylinder operated in conjunction with said auxiliary power system and from the same control to assist said auxiliary power system in swinging the movable framework through an arc, a U-shaped member pivotally mounted on the upper end of said stationary framework, a rod connecting said movable framework with said U-shaped member whereby said U-shaped member is caused to swing through an arc equal and opposite to that of the movable framework, a load carrying fork pivotally mounted at the free end of said movable framework, link mechanism connecting said U-shaped member with said load carrying fork to maintain said load carrying fork in substantially horizontal position at any position of the movable framework, means for locking said link mechanism in said load carrying fork supporting mechanism and means for releasing said locking means.

NOAH NOLT SAUDER.